UNITED STATES PATENT OFFICE.

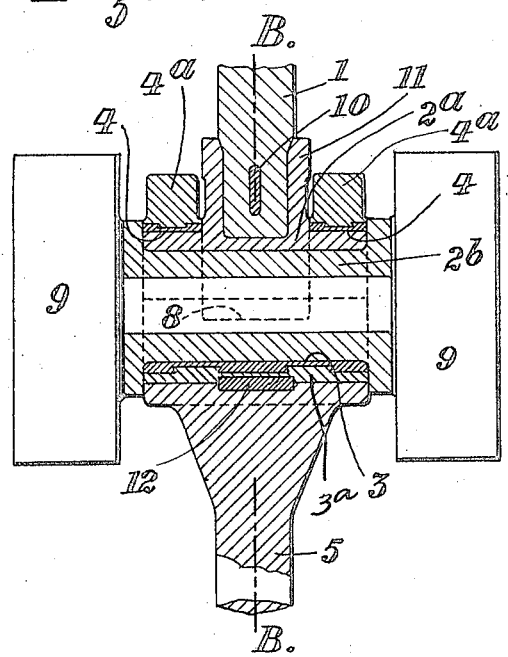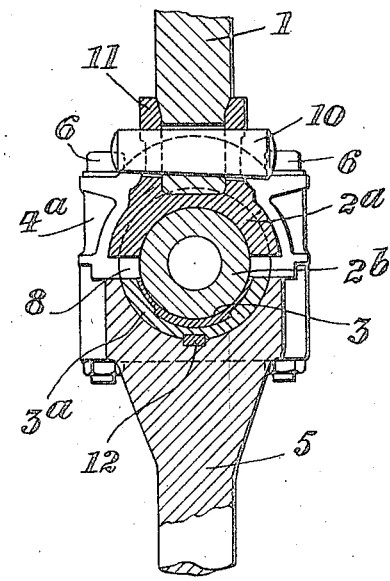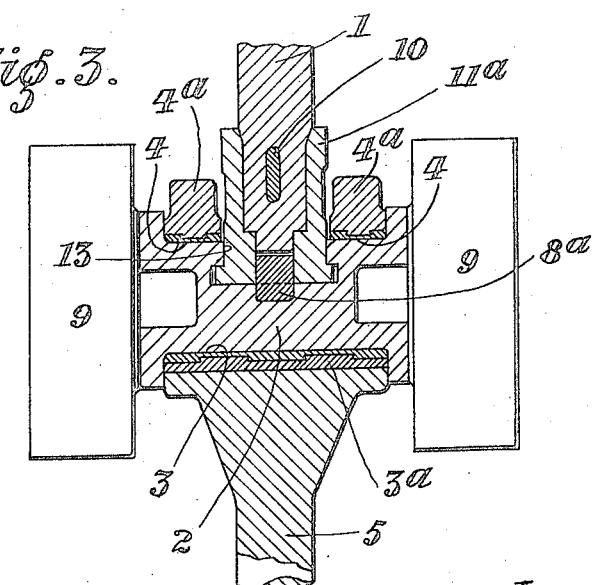

DAVID RAMAGE HUTCHISON, OF GREENOCK, SCOTLAND, ASSIGNOR TO SCOTT'S SHIPBUILDING & ENGINEERING COMPANY, LIMITED, OF GREENOCK, SCOTLAND.

ENGINE CROSSHEAD.

1,403,165. Specification of Letters Patent. Patented Jan. 10, 1922.

Application filed July 1, 1920. Serial No. 393,400.

(GRANTED UNDER THE PROVISIONS OF THE ACT OF MARCH 3, 1921, 41 STAT. L., 1313.)

*To all whom it may concern:*

Be it known that I, DAVID RAMAGE HUTCHISON, of 33 East Crawford Street, Greenock, Scotland, a subject of the King of Great Britain, have invented certain new and useful Improvements in and Relating to Engine Crossheads, (for which I have filed an application in England, June 17, 1919, Patent No. 135.440,) of which the following is a specification.

This invention relates, to engine crossheads of the kind formed with a large bearing surface on one side of the crosspin, through which the thrust is transmitted, and with oppositely disposed smaller bearing surfaces to take any pressure in the opposite direction.

Under this invention we provide an improved construction of crosshead of the this kind characterized by the combination of a saddle piece on the piston rod and resting against a separate crosspin, a bearing portion for the pin carried by the connecting rod, and cap bearing portions arranged one on either side of the saddle piece and secured to the connecting rod so as to be angularly movable therewith.

Under a modification we form the crosspin with an undercut slot adapted to receive the enlarged end of a modified form of saddle piece which is keyed into the slot and is also rigidly secured on the end of the piston rod, in suitable manner.

The various parts constituting the improved crosshead can be readily constructed and machined to shape and any repairs that may subsequently be necessary to the crosshead can be easily carried out without necessitating a special plant or special facilities for the purpose.

The invention is illustrated, by way of example on the accompanying drawings forming part of this specification, and whereon:—

Fig. 1 is a longitudinal section of the improved crosshead and bearing.

Fig. 2 is a cross section on the line B—B Fig. 1.

Fig. 3 is a cross sectional view of the modification.

Referring first to Figs. 1 and 2, a saddle piece $2^a$ on the piston rod 1, rests upon a separate crosspin $2^b$ which provides a long uninterrupted bearing surface 3 for the lower bearing brass or shell $3^a$ of the connecting rod 5 while the saddle piece affords shorter bearing surfaces, 4, 4 one on each side of the piston rod, for the cap portions $4^a$, $4^a$, of the connecting rod.

The cap portions $4^a$ $4^a$ and the connecting rod 5, are shown secured together in the usual manner by bolts 6.

The crosspin may be cored or holed and the bearing may be lined with antifriction metal as illustrated, while the upper walls of the lower portion $3^a$ of the bearing may be cut away as at 8, if necessary, to obtain the required degree of angular movement of the connecting rod about the crosspin. 9, 9, are the crosshead slippers adapted to work in the usual manner in crosshead guides (not shown).

The piston rod 1 and saddle piece $2^a$ are shown connected by means of a cotter 10 passing through suitable openings in the sleeve portion 11 of the saddle and in the piston rod but they may be connected in any other suitable manner, as by means of bolts.

A key 12 prevents movement of the bearing $3^a$ relatively to the connecting rod 5.

In the modification illustrated in Fig. 3, the crosspin 2 is slotted across at 13 and undercut to receive the enlarged lower end of a modified form of saddle piece $11^a$ which is fitted in the slot and locked in position by a key $8^a$ driven partly into the pin and partly into the saddle piece. The saddle piece is cottered to the piston rod 1 by a cotter 10 or rigidly secured thereto in any other desirable manner. As before, the crosspin provides a long uninterrupted bearing surface 3 for the bearing brass or shell $3^a$ of the connecting rod but, in this case, the shorter bearing surfaces 4, 4, for the caps $4^a$, $4^a$, are formed on the upper portion of the crosspin 2 on either side of the saddle piece $11^a$.

The crosshead according to this invention is particularly suitable for use in internal combustion engines and as will be apparent from the foregoing description and the accompanying drawings, the construction of the various parts is such that they can be machined to shape and kept in repair without difficulty or the use of special machinery.

Having now fully described my invention what I claim and desire to secure by Letters Patent is:—

1. The combination with a piston rod and a connecting rod of a saddle piece on the piston rod, a cross pin located between the saddle piece and the connecting rod and bearing caps arranged one on either side of the saddle piece and secured to the connecting rod so as to be angularly movable therewith about the cross pin.

2. The combination with a piston rod and a connecting rod of a saddle piece on the piston rod a cross pin located between the saddle piece and the connecting rod, and a bearing for the pin comprising a partial bearing on the connecting rod, bearing caps arranged one on either side of the saddle piece, and means securing the bearing caps to the connecting rod so as to be angularly movable therewith about the cross pin.

3. In combination with a piston rod, and a connecting rod, of a saddle piece, means removably securing the saddle piece to the piston rod, a cross pin against which the saddle piece rests, a bearing portion for the cross pin carried by the connecting rod, cap bearing portions arranged one on either side of the saddle piece, and means removably securing said cap bearing portions to the connecting rod so as to be angularly movable therewith.

4. The combination with a piston rod and a connecting rod of a saddle piece on the piston rod, a cross pin formed with an undercut slot, the saddle piece having an enlargement which fits into said slot, means keying the saddle piece to the cross pin, a bearing portion for the cross pin carried by the connecting rod and cap bearing portions arranged on the cross pin one on either side of the sleeve and secured to the connecting rod.

5. The combination with a piston rod and a connecting rod, of a saddle piece, means keying the saddle piece to the piston rod, a cross pin engaged by the saddle, a bearing portion for the pin carried by the connecting rod, oppositely disposed smaller bearing portions arranged one on either side of the saddle and means securing the parts of the bearing together, substantially as set forth.

6. The combination with a piston rod and a connecting rod, of a saddle piece removably secured to the piston rod a cross pin against which the saddle piece rests, slippers for the pin, a bearing portion for the pin carried by the connecting rod, oppositely disposed smaller bearing portions arranged one on either side of the saddle piece and means securing the parts of the bearing together with the pin located between them, substantially as set forth.

In testimony whereof I affix my signature in presence of two witnesses.

DAVID RAMAGE HUTCHISON.

Witnesses:
T. ALEXANDER,
A. WINGATE.